MEMORY SYSTEMS

Filed June 16, 1959 2 Sheets-Sheet 1

INVENTORS
JAMES C. MILLER &
ARTHUR W. LO
BY John V. Regan
ATTORNEY

INVENTORS
JAMES C. MILLER &
ARTHUR W. LO
BY John V. Regan
ATTORNEY

United States Patent Office 3,120,653

Patented Feb. 4, 1964

3,120,653
MEMORY SYSTEMS

James Cobean Miller, Hamilton Square, and Arthur W. Lo, Princeton, N.J., assignors to Radio Corporation of America, a corporation of Delaware Filed June 16, 1959, Ser. No. 820,673
19 Claims. (Cl. 340—173)

This invention relates to memory systems, and particularly to memory systems using semiconductor storage elements.

Prior art memory systems include diode-capacitor elements arranged in a two-dimensional array. Selecting means are provided for storing information in and reading information from any desired one of the storage capacitors. In such systems, the two binary information digits are often represented by the two polarities of charge stored in the capacitor. In certain prior systems the two binary digits, "1" and "0," are represented by the presence or absence, respectively, of a charge stored in the capacitor. One of the problems with the prior memory systems is that the charge stored in the capacitor leaks off in a finite time. Thus, in order to retain the stored information, the information content of the entire memory is periodically regenerated. The regeneration operation includes reading and rewriting the information from and into each storage element. This regeneration operation is undesirable. Also, certain prior memory systems require relatively high power consumption due to the use of diode rectifiers which have a relatively high forward resistance compared to that obtainable with semiconductor diodes of the type used in the present invention.

It is an object of the present invention to provide improved memory systems using semiconductor storage elements.

Another object of the present invention is to provide improved memory systems in which the stored information is retained without requiring regeneration.

Still another object of the present invention is to provide improved memory systems which operate at a relatively high speed and which use relatively small power.

According to the present invention, a memory element includes a pair of negative resistance type diodes connected in series with each other. Input signals are applied to a junction point between two diodes to store information. The thus stored information is read out across one of the two diodes. According to one feature of the invention, the intrinsic capacity of the semiconductor material is used to provide the storage function. The two binary digits may be represented by either a relatively high or low output signal in one mode of operation of the element, or by symmetrical and asymmetrical signals, respectively, in another mode of operation of the element.

Figures 1, 2, 3, 4, 5, 6:
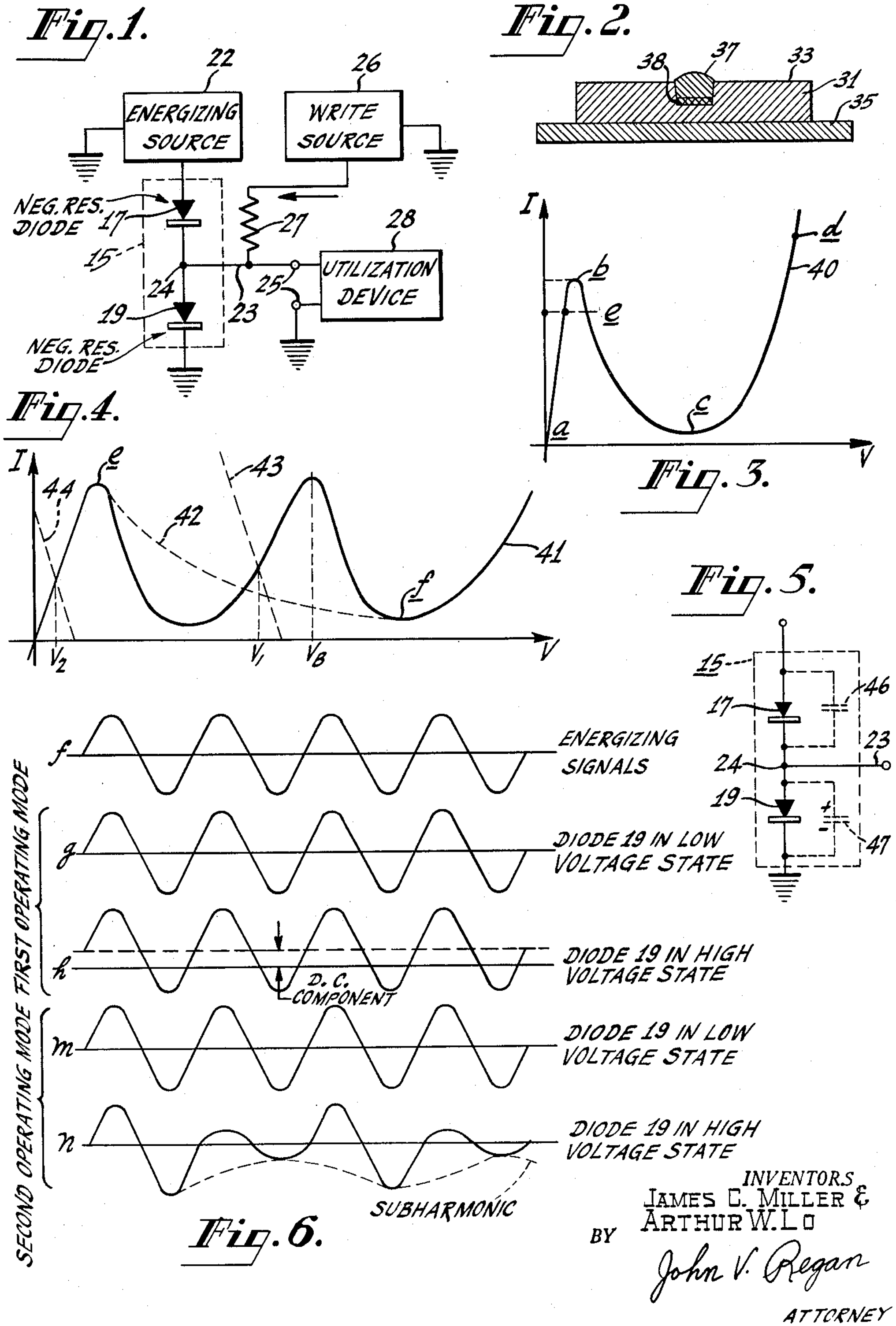
FIG. 1 is a schematic diagram of one embodiment of a memory system according to the invention.
FIG. 2 is a cross-sectional diagram of one form of negative resistance diode suitable for use in the present invention.
FIG. 3 is a characteristic cure for a negative resistance diode useful in the memory systems of the present invention.
FIG. 4 is a composite characteristic of the two series connected diodes of the system of FIG. 1.
FIG. 5 is a schematic diagram of the series connected diodes of the system of FIG. 1 with the intrinsic capacitances indicated in the diagram.
FIG. 6 is a diagram of waveforms illustrating two different modes of operation of a memory system according to the invention.

The exemplary memory element 15 of FIG. 1 has a pair of negative resistance type diodes 17 and 19 connected in series with each other, for example, in the same sense. An energizing source 22 is connected across the memory element 15. The return path for the source 22 energizing signals is provided via a common point of reference potential, indicated in the drawings by the conventional ground symbol. An output line 23 is connected between the junction point 24 between the diodes 17 and 19 and a first one of a pair of output terminals 25. The second output terminal 25 is connected to ground. A write source 26 is connected in series with a decoupling impedance, indicated as a resistor 27 to the junction point 24. A utilization device 25 is connected across the output terminals 28.

Each of the diodes 17 and 19 has a current versus voltage characteristic having a negative resistance region connecting two positive resistance regions. The negative resistance diodes may be of the type described in an article by L. Esaki published in the Physical Review 109, 603, 1958. Another type of negative resistance diode suitable for use in the present invention is shown in cross-section in FIG. 2. The diode of FIG. 2 may be fabricated as follows: a single crystal bar of n-type germanium is doped with arsenic to have a donor concentration $4.0\times10^{19}$ cm.$^{-3}$ by methods known in the semiconductor art. This may be accomplished, for example, by pulling a crystal from molten germanium containing the requisite concentration of arsenic. A wafer 31 is cut from the bar along the 111 plane, i.e. a plane perpendicular to the 111 crystallographic axis of the crystal. The wafer 31 is etched to a thickness of about two mils in a suitable etch solution. A major surface of the wafer 31 is soldered to a strip 35 of nickel, with a lead-tin-arsenic solder, to provide a non-rectifying contact between the wafer 31 and the strip 35. The nickel strip 35 serves eventually as a base lead. A five mil diameter dot 37 of 99 percent by weight indium, 0.5 percent by weight zinc and 0.5 percent by weight gallium is placed with a small amount of a commercial flux on the free surface 33 of the germanium wafer 31 and then heated at 450° C. for one minute in an atmosphere of dry hydrogen to alloy a portion of the dot to the free surface 33 of the wafer 31, and then cooled rapidly. In the alloying step, the unit is heated and cooled as rapidly as possible so as to produce an abrupt p-n junction 38. The unit is then given a final dip etch for five seconds in a slow iodide etch solution, followed by rinsing in distilled water. A suitable slow iodide etch is prepared by mixing one drop of a solution comprising 0.55 gram potassium iodide, and 100 cm.$^3$ water in 10 cm.$^3$ of a solution comprising 600 cm.$^3$ concentrated nitric acid, 300 cm.$^3$ concentrated acetic acid, and 100 cm.$^3$ concentrated hydrofluoric acid. A pigtail connection may be soldered to the dot where the device is to be used at ordinary frequencies. Where the device is to be used at high frequencies, contact may be made to the dot 37 with a low impedance lead.

The curve 40 of FIG. 3 shows a current versus voltage characteristic for a negative resistance diode. The negative resistance region appears on the portion of the curve 40 between the points *b* and *c*. The curve 40 portions between the points *a*, *b* and *c*, *d* are positive resistance regions. The point *b* of the curve 40 represents a "break" point at which the current flow through the diode rapidly decreases as the applied voltage increases. The two positive regions are stable operating regions and the negative region is an unstable operating region. The solid curve 41 of FIG. 4 represents the composite characteristic of the two series-connected diodes 17 and 19 of FIG. 1. The composite curve 41 represents the condition wherein one of the diodes 17 or 19 reaches the "break" point before the other. If the two diodes 17 and 19 exhibited identical characteristics, both would reach the "break" point at exactly the same applied voltage and the composite characteristic between the points *e* and *f* would resemble that represented schematically by the dotted line 42. In practice, however, only one of the diodes reaches the "break" point at a time. Thus, the solid curve 41 is the one of interest in the present invention. The load line 43 of the curve 41 corresponds to that of the one diode which first passes the "break" point with increasing voltage applied, and the load line 44 represents the load line of the other of the two diodes. The slope of the load lines is determined by the internal impedance of the energizing source 22 (FIG. 1). Preferably, the source impedance is of relatively low value, such as might be obtained from a constant-voltage source. The energizing source 22 signal amplitude is regulated to have a maximum value less than a value VB required to "break" both diodes in succession. A relatively high voltage V1 appears across the lower diode 19 when that diode breaks first, and the relatively low voltage V2 then appears across the upper diode 17. When the diode 17 "breaks" first, the voltages V1 and V2 appear across the diodes 17 and 19, respectively.

The write current from the write source 26 operates to select the one diode which first reaches the "break" point. A positive write current (assumed to be in the conventional direction of flow) causes the lower diode 19 to break before the upper diode 17. Accordingly, the relatively high voltage V1 appears across the diode 19 and the relatively low voltage V2 appears across the diode 17. A negative polarity write current flowing out of the junction 24 causes the upper diode 17 to "break" first, and the relatively low voltage V2 then appears across the lower diode 19. The relatively high and low voltages across the diode 19 appear across the output terminals 25 and 28 and correspond, respectively, to the two binary information signals. Upon removal of the energizing signal, both diodes, assuming a sufficiently long time interval as described more fully hereinafter, return to the condition represented by the origin of the curve 41.

In practice, each of the diodes 17 and 19 has an internal capacitance indicated in FIG. 5 by the dotted capacitances 46 and 47, respectively. The internal capacitance of one of the diodes, to a first approximation, corresponds to the transition capacity of the diode junction due to the depletion layer. The magnitude of one of these capacitances, for one semiconductor material, for example, germanium, may vary from between one hundred to one thousand micro-microfarads. The rapid voltage change across the diode 17 or 19 that "breaks" first operates to charge its associated capacitance 46 or 47. For example, when the diode 19 "breaks" first, the capacitance 47 charges to the relatively high voltage of the polarity indicated in FIG. 5 by the + and − signs. The capacitance 46 associated with the diode 17 charges to a relatively low voltage. When the energizing signal is removed, the charged capacitance 47 begins to discharge through the internal resistance of the diode 19 and through the external circuit. This internal resistance corresponds to the negative resistance region *b, c* of the characteristic curve 40. Again assuming germanium type semiconductor material, the negative resistance value may vary from a relatively low value, say 10 ohms to a relatively high value, say 1500 ohms. Accordingly, a finite time is required for the capacitance 47 (FIG. 5) to discharge to a relatively low voltage. The discharge interval is determined to a large extent by the RC time constant of the diode structure. During the discharge interval, the capacitance 47 applies a positive voltage across the lower diode 19. This internally applied voltage can be considered a bias type signal which primes the diode 19 in the forward direction. Therefore, when a second positive energizing signal is applied, within the discharge interval, to the memory element 15, the diode 19 again "breaks" to the high voltage state, and the internal capacitance 47 again is charged to the relatively high voltage. This second energizing signal is applied within the discharge time interval, defined as the time interval in which the capacitance 47 discharges below a given, fixed value necessary to prime the diode 19. This fixed value may be, for example, that producing a current flow into the diode 19 anode of amplitude equal to the current measured between the points *e* and *b* of the curve 40 of FIG. 3. The energizing signal causes the additional current flow equal to the value slightly in excess of that measured between the points *a* and *e* of the curve 40. Thus, the discharge current of the capacitance and the energizing signal current jointly maintain the one diode in the high voltage state. In practice, the spacing between successive positive energizing signals is made relatively small compared to the RC discharge time constant of the diodes. Thus, once information is stored in the memory element 15 by a write signal of suitable polarity, the energizing source 22 maintains this stored information until a new write signal is applied. Each write signal is made of sufficiently large amplitude so that the diode 19 is brought to either the high or the low voltage state as desired and regardless of its previous state. That is, the new write signal overrides any prior stored information to cause the memory element 15 to assume the state corresponding to the new write signal.

Conveniently, the energizing source 22 may be a sinusoidal source of r.f. (radio frequency) signals. Note that the state of the diode 19 corresponds to the complement of the stored information. That is, when the diode 17 is in the high voltage state, corresponding to say a binary "1," then the diode 19 is in the low voltage state corresponding to the binary "0." Likewise, when the diode 19 stores a binary "0," the diode 17 stores a binary "1." If desired, the output signals can be taken across the diode 17. The negative phase of the R.F. energizing signal does not adversely affect the operation of the memory since it merely corresponds to the time interval between successive positive energizing signals. If desired, however, the energizing source 22 may be a periodic pulse type source applying pulses of suitable polarity and repetition rate to the memory element 15. The memory system may be operated according to two different modes providing two different types of output signals. In one mode, a D.C. type output is provided. The two different binary digits are represented in the one mode by output signals having relatively no and a relatively large D.C. component, respectively. In the second mode, an A.C. (alternating current) type output is provided. The two different binary digits are represented in the second mode by output signals having or not having a subharmonic frequency component, respectively.

The output waveforms of lines *g* and *h* of FIG. 6 correspond to the first mode using sinusoidal type energizing signals, such as those shown in line *f*. The amplitude of the energizing signals are maintained at a value less than a critical value at which the memory element provides a subharmonic of the energizing signal. This critical value of energizing signal amplitude is readily observed by connecting an oscilloscope across the output terminals 25. The critical amplitude corresponds to the point at which the memory system provides an output signal at the subharmonic frequency. The waveform of line *g* corresponds to the storage of a binary "0" digit as, for example, when a negative polarity write pulse is applied to the common junction 24 by the write source 26. The waveform of line $g$ is symmetrical about the base line and has no appreciable D.C. (direct current) component. The waveform of line $h$ corresponds to the storage of a binary "1" digit when a positive polarity write signal is applied to the common junction 24 by the write source 26. The waveform of line $h$ has a relatively large D.C. component. Thus, the two stored binary digits "1" and "0" can be detected by providing any storage device, responsive to the presence and absence, respectively, of the relatively large D.C. component of the output waveform. A suitable detecting device, for example, is a difference amplifier (not shown) which may be included as a part of the utilization device 28. Thus, the difference amplifier may have one input for receiving the memory output signals and a second input for receiving a symmetrical reference signal at the frequency of the energizing signal. The difference amplifier then provides an output only when the input signal differs from the reference signal.

Figure 8:
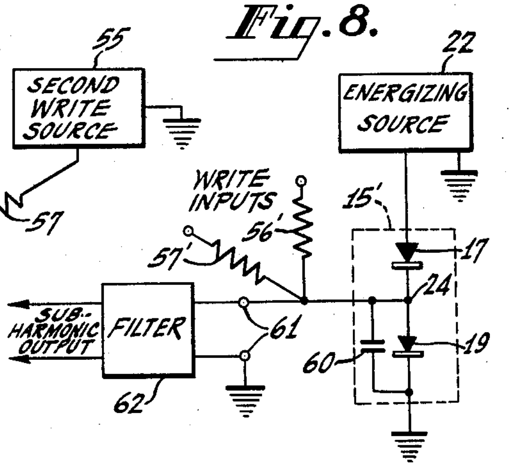
FIG. 8 is a schematic diagram of an embodiment of a memory system according to the invention using an external storage capacitor.

The output waveforms of lines $m$ and $n$ of FIG. 6 correspond to the second mode of operating the memory system. In the second mode, the energizing signal has an amplitude larger than the critical value. The waveform of line $m$ corresponds to the storage of a binary "0" digit as, for example, when the negative polarity write signal is applied to the common junction 24. The waveform of line $m$ is of the same frequency as the energizing signal frequency and has no appreciable subharmonic components. The waveform of line $n$ corresponds to the storage of a binary "1" digit when a positive polarity write signal is applied to the common junction 24. The waveform of line $n$ has a relatively large subharmonic component, indicated by the dotted waveform. The subharmonic frequency is one-half the frequency of the energizing signal. Thus, the two stored binary digits can be detected by providing any suitable device responsive to the presence and absence, respectively, of the relatively large subharmonic component of the output waveform. This detecting device, for example, may be a filter circuit (such as indicated in FIG. 8). If desired, the filter circuit may be included as a part of the utilization device 28.

A suitable filter circuit, for example, is a selective bandpass filter having its pass band oriented at the second subharmonic of the energizing source signals, and having strong rejection at the fundamental and second harmonic of the energizing source signal. The filter also has a high input impedance with respect to the memory output signals thereby preventing loading of the memory element 15. The presence of an output signal from the filter circuit represents the storage of a binary "1" digit in the memory element 15, and the absence of an output signal from the filter circuit represents the storage of a binary "0" in the memory element 15.

Preferably, the energizing source 22 is one having a low internal impedance in order to reduce the loading effects of the negative resistance diodes. Presently available negative resistance diodes exhibit an internal impedance in the order of about one ohm. In certain applications, it may be desirable to use an energizing source of relatively high impedance. In such case, an impedance match between the energizing source and the memory element 15 can be obtained by transformer coupling. In the memory system of FIG. 7, a linear transformer 50 has its primary winding 51 coupled to an energizing source 52. The internal impedance of the energizing source 52 is matched to the impedance of the memory element 15 by suitably adjusting the turns-ratio of the transformer 50. The end terminals of a secondary winding 53 of the transformer 50 are connected across the memory element diodes 17 and 19. The output terminals 58 and 59 of the memory element may be coupled across the diode 19 to receive the two distinct output signals. The common ground connection for the system of FIG. 7 can be provided by connecting the cathode of the diode 19 to ground at the output terminal 59, or as shown in the drawing, by providing a transformer 50 having a center-tap connected to ground and the terminal 59 replaced by a grounded output terminal 59'.

In the first case with the system ground connection provided at the output terminal 59, the operation is similar to that described above for the device of FIG. 1 and will be understood from what has been said hereinbefore.

In the second case, with the center-tap of the transformer 50 connected to ground, the two outputs appearing across the output terminals 58 and 59' are symmetrical with respect to each other. One of the two symmetrical outputs is a D.C. voltage level of one polarity and is similar to that shown in line $h$ of FIG. 6. The other of the two symmetrical outputs is the image of that shown in line $h$ of FIG. 6 and is a D.C. voltage level of the opposite polarity.

Also, in the second case, with the grounded centertap, the two symmetrical outputs may be of the subharmonic type. Thus, by suitably operating the energizing source 52 as described above in connection with FIG. 1, the one subharmonic output of relatively negative polarity corresponds to that shown in line $n$ of FIG. 6. The other subharmonic output is of relatively positive polarity and is 180° out of phase with that shown in line $n$ of FIG. 6. Thus, the two outputs using a center-tapped secondary winding are the mirror images of each other.

Figure 7:
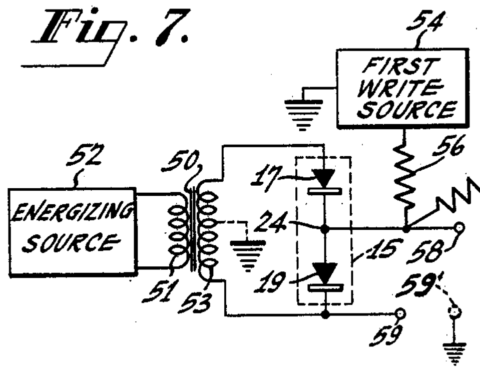
FIG. 7 is a schematic diagram of another embodiment of a memory system according to the invention using transformer coupling between the storage elements and an energizing source.

If desired, coincident write signals may be used to set the memory system of FIGS. 1 or 7 to a desired state. For example, in FIG. 7 first and second write sources 54 and 55 are connected to the junction point 24 by any suitable impedance elements such as decoupling resistors 56 and 57, respectively. Impedance values of say, 100 to 1500 ohms are adequate to provide sufficient decoupling action. Each of the first and second writing sources 54 and 55 is arranged to apply a write current of approximately one-half the amplitude required to select the one of the diodes 17 and 19 which is to be set to the high voltage state.

The RC discharge time-constant of the memory element 15 may be increased by connecting an external capacitor 60 across the diode 19 as shown for the memory element 15' of FIG. 8. The remaining elements of the system of FIG. 8 may be the same as those described for either FIG. 1 or 7.

In operation, the capacitor 60 is charged to either a relatively high voltage or a relatively low voltage to provide the two distinct output signals across the output terminals 61. A filter circuit 62 is connected across the output terminals 61 to provide the subharmonic output frequency corresponding to the storage of one of the binary digits. The storage of the other binary digit is indicated by the absence of any subharmonic frequency signal from the filter circuit 62.

Figure 9:
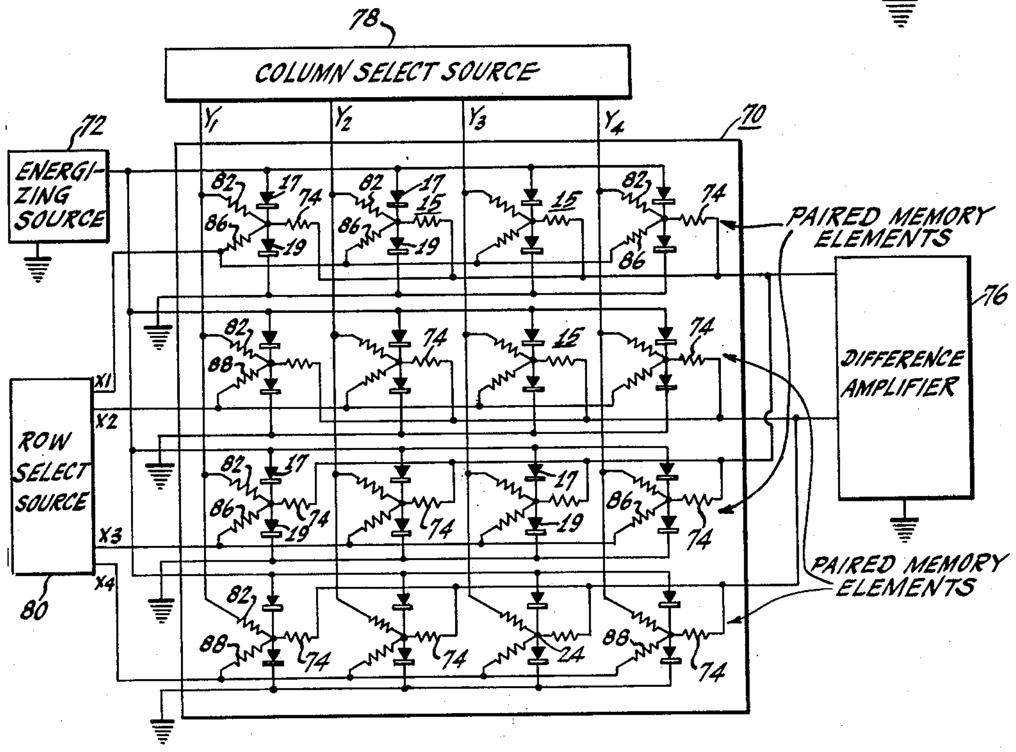
FIG. 9 is a schematic diagram of a two-dimensional system according to the invention using a plurality of the memory elements of FIG. 1.

A plurality of the memory elements 15 may be interconnected with each other in a memory array to provide random access storage of a plurality of information signals. For example, an embodiment of a two-dimensional array 70 according to the invention is shown in FIG. 9. The array 70 has, for example, a 4 x 4 array of the memory elements 15. Two memory elements 15 are used to store each binary digit. Each element 15 includes a pair of the series-connected diodes 17 and 19. Thus, the sixteen elements 15 of the array 70 provide storage for eight separate binary digits. The elements 15 of alternate rows of the array 70 are paired with each other. The elements 15 of the first row, beginning at the top, are paired with the elements 15 of the third row, and the elements 15 of the second row are paired with the elements 15 of the fourth row. A common energizing source 72 is coupled to all the elements 15 of the array. A common ground return is provided between each of the elements 15 and the energizing source 72. The elements 15 of the first and third rows have their junction points 24 coupled via a different one of the eight impedance elements, such as decoupling resistors 74 to a first input of a difference amplifier 76. The junction points 24 of the second and fourth rows are similarly coupled via separate impedance elements 74 to the second input of the difference amplifier 76. Thus, the two inputs of the difference amplifier receive equal amplitude voltage inputs for each stored binary digit "1" or "0." A column select source 78 and a row select source 80 are used to write the digits into the memory elements 15. The column select source 78 has four output lines *y*1, *y*2, *y*3 and *y*4. The four outputs of the column select source 78 are coupled via a different impedance element, such as the decoupling resistors 82, to the respective memory elements 15 of the four array columns. The row select source 80 is provided with two pairs of output lines *x*1, *x*2 and *x*3, *x*4. The *x*1 and *x*3 output lines are coupled via a different decoupling impedance element, such as the resistors 86, to the junction points 24 of the first and third rows, respectively, of memory elements 15. The *x*2 and *x*4 output lines are coupled via separate impedance elements, such as decoupling resistors 88, to the junction points 24 of the second and fourth rows, respectively, of memory elements 15.

In operation, the difference amplifier 76 is normally in its balanced condition due to the equal amplitude and like polarity signals applied to its two inputs. Thus, if a binary "1" is stored in the memory element 15 of the first row and column, a binary "1" digit is stored in the paired memory element 15 of the third row and first column, and so on.

Information is written into a desired pair of memory elements by concurrently applying signals of either positive or negative polarity to the one column line and the two row lines of the desired pair of elements 15. The polarities of the column signal and the two row signals are the same. The coincidence of the column signal and the row signals at the desired pair of memory elements causes the one or the other of the two diodes 17 and 19, as desired, in each of these elements to "break" thereby storing the corresponding binary digit "1" or "0" therein.

The stored information is read out from any desired pair of memory elements by activating the one column line and only one of the row lines of that pair of elements 15. The row lines *x*3 and *x*4 are used during the read operation, and the row lines *x*1 and *x*2 are not used. Like polarity read currents are applied to the two selected lines during the read operation. The read currents, say of positive polarity, produce a net signal of sufficient amplitude to cause the diode 19 of the selected element 15 of the third or fourth array row to "break" to the high voltage state. If the diode 19 of the thus selected element 15 is already in the high voltage state, no net change of signal appears across the inputs of the difference amplifier 76, indicating that a binary "1" digit is stored in the selected memory element 15. However, if the diode 19 charges to the high voltage state, a net signal change is applied to the difference amplifier 76, thereby indicating the storage of the binary "0" digit in the selected element 15. The changed element 15 can be returned to its initial condition by applying negative polarity signals to the column and row lines of that element. Any other pair of elements 15 can be selected in similar fashion during the read operation.

The memory element 15' of FIG. 8 also can be arranged in a coincident current memory system in similar fashion. However, because of the external storage capacitor 60, a separate binary digit can be stored in each of the memory elements 15' of an array. A common sensing amplifier is then used in place of the difference amplifier 76 of FIG. 9. Suitable sensing amplifiers are known in the art.

What is claimed is:

1. A storage device having two states comprising a pair of negative resistance diodes, means for applying selectively signals of either one or the other polarity to a mid-point between said diodes to establish said device in the one or the other of said two states respectively, means for applying pulse signals across said diodes to maintain said established state, and an output terminal connected to said mid-point.

2. In a memory system, the combination comprising a pair of negative resistance diodes connected to each other at a mid-point, a storage element connected across one of said pair of diodes, means for applying selectively signals of either one or the other polarity to said mid-point and an output terminal connected to said mid-point.

3. In a memory system, the combination comprising a pair of negative resistance diodes, each having a relatively high and a relatively low operating voltage state, means to apply selectively a signal of either one or the other polarity to a mid-point between said diodes to set said diodes to the one and the other of said high and low voltage states, respectively, means for applying energizing signals across said pair of diodes to maintain said set states, and means connected across one of said diodes for taking an output signal corresponding to said selectively applied signal.

4. In a memory system, the combination comprising a pair of negative resistance diodes connected to each other in the same sense, a storage element connected across one of said diodes, a pair of output terminals connected across one of said diodes, means for applying write signals respectively of either one or the other polarity to a mid-point between said diodes.

5. In a memory system, the combination comprising a pair of negative resistance diodes, means for applying energizing signals across said pair of diodes, said energizing signals having an amplitude less than a critical value required to produce subharmonic output signals across one of said pair of diodes, and means for applying a signal of either one or the other polarity to a mid-point between said diodes, said one polarity signal causing said one diode to provide an output signal having a relatively large D.C. component and said other polarity signal causing said one diode to provide output signals having relatively no D.C. component.

6. In a memory system, the combination comprising a pair of negative resistance diodes connected to each other at a mid-point, means for applying energizing signals in excess of a critical value required to produce subharmonic oscillations across one of said diodes, means for applying selectively signals of either one or the other polarity to said mid-point, said one polarity signals causing said one diode to produce output signals having a relatively large subharmonic component, and said other polarity signals causing said one diode to produce output signals having substantially no subharmonic component.

7. In a memory system, the combination comprising a pair of negative resistance diodes connected to each other at a midpoint, means for applying energizing signals in excess of a critical value required to produce subharmonic oscillations across one of said diodes, means for applying selectively signals of either one or the other polarity to said mid-point, said one polarity signals causing said one diode to produce output signals having a relatively large subharmonic component, and said other polarity signals causing said one diode to produce output signals having substantially no subharmonic component, said energizing signals being transformer coupled across said pair of diodes.

8. In a memory system, the combination comprising a pair of negative resistance diodes each having intrinsic capacitance and resistance, means for applying energizing signals across said pair of diodes, means for applying selectively signals of either one or the other polarity to a junction point between said diodes, said energizing signals and said one polarity signals jointly causing the said capacitance of one of said diodes to assume a relatively large charge value and the said capacitance of the other of said diodes to assume a relatively low charge value, and said one diode to assume a relatively small charge value and said other diode to assume a relatively large charge value for said other polarity signals, successive ones of said energizing signals being applied within a time interval relatively short with respect to the discharge time constant of said capacitance and resistance of any one of said diodes, and an output circuit connected across one of said diodes.

9. In a memory system, the combination comprising a pair of negative resistance diodes each having intrinsic capacitance and resistance, means for applying energizing signals across said pair of diodes, means for applying selectively signals of either one or the other polarity to a junction point between said diodes, said energizing signals and said one polarity signals jointly causing the said capacitance of one of said diodes to assume a relatively large charge value and the said capacitance of the other of said diodes to assume a relatively low charge value, and said one diode to assume a relatively small charge value and said other diode to assume a relatively large charge value for said other polarity signals, successive ones of said energizing signals being applied within a time interval relatively short with respect to the discharge time constant of said capacitance and resistance of any one of said diodes, and an output circuit connected across one of said diodes, said output circuit including a band-pass filter circuit having a pass band oriented at a frequency substantially equal to one half that of said energizing signals.

10. The memory system comprising a pair of negative resistance diodes connected in series with each other, said diodes each having a relatively high and a relatively low operating state in accordance with the polarity of signals selectively applied to a junction point between said diodes, and means for applying energizing signals across said diodes to maintain them in the said operating states determined by said selectively applied signals.

11. A memory system comprising a pair of negative resistance diodes each having a relatively high and a relatively low voltage operating state, said pair of diodes each having one electrode connected to a junction point, means for setting a desired one of said diodes to said high voltage state and the other of said diodes to said low voltage state, and means for applying energizing signals across said pair of diodes to sustain said diodes in the states thus set, each of said diodes having an intrinsic capacity and a relatively high internal resistance, said energizing signals being periodic signals and successive ones of said energizing signals being applied within the RC time-constant of said intrinsic capacity and internal resistance of said diodes.

12. A memory system comprising a pair of negative resistance diodes, each having a relatively high and a relatively low voltage operating state, each of said diodes having one electrode connected at a junction point, means for applying a signal to said junction point to set one of said diodes to the high voltage state and the other of said diodes to the low voltage state in accordance with the polarity of the signal applied by said means, a capacitor having one plate connected to said junction point and the other plate connected to the other electrode of one of said diodes, and means for applying energizing signals periodically across said pair of diodes.

13. A memory system comprising negative resistance diodes each having an anode and a cathode, each of said diodes having a relatively high voltage and a relatively low voltage operating state, a junction point, the said cathode of one of said diodes and the said anode of the other of said diodes being connected to said junction point, means for setting one of said diodes to said high voltage state and the other of said diodes to said low voltage state, energizing means connected to the anode of said one diode and the cathode of said other diode for maintaining said diodes in said set states, and a pair of output terminals connected across one of said diodes.

14. A memory system as claimed in claim 13 said means for applying energizing signals including a transformer having a secondary winding having center and end terminals, said end terminals being connected across said pair of diodes, a point of common reference potential, said center terminal being connected to said point of common reference potential, said transformer further having a primary winding connected to receive said energizing signal.

15. A memory system comprising a pair of negative resistance diodes, each having a relatively high voltage and a relatively low voltage operating state, and each requiring a signal of at least a given amplitude to be applied thereto to change from said high voltage to said low voltage operating state, said diodes being connected in series with each other in the same sense, first and second writing means connected at a junction point between said pair of diodes for applying selectively to said diodes write signals of either one or the other polarity, any one of said write signals having an amplitude less than said given amplitude, and any pair of write signals of like polarity together having an amplitude greater than said given amplitude, and means for applying energizing signals across said pair of diodes.

16. A memory system comprising a plurality of pairs of negative resistance diodes, each of said diodes having a relatively high and a relatively low voltage operating state, a current of given amplitude being required to change any one of said diodes from said high to said low operating state, said pairs of diodes being arranged in rows and columns, a plurality of column lines each coupled to all said pairs of diodes of a different one of said columns, a plurality of row lines each coupled to all said pairs of diodes of a different one of said rows, means for applying energizing signals across all said pairs of diodes, and a difference amplifier having a first input connected to all the said pairs of diodes of alternate ones of said rows, and a second input connected to all the said pairs of diodes of the other alternate ones of said rows.

17. In a memory system, the combination comprising a pair of negative resistance diodes, means for applying energizing signals across said pair of diodes, said energizing signals having an amplitude less than a critical value required to produce subharmonic output signals across one of said pair of diodes, and means for applying a signal of either one or the other polarity to a midpoint between said diodes, said one polarity signal causing said one diode to provide a first output signal having a relatively large D.C. component of one polarity, and said other polarity signal causing said one diode to provide a second output signal having a relatively large D.C. component of the opposite polarity from that of said first signal.

18. In a memory system, the combination comprising a pair of negative resistance diodes connected to each other at a mid-point, means for applying energizing signals in excess of a critical value required to produce subharmonic oscillations across one of said diodes, means for applying selectively signals of either one or the other polarity to said mid-point, said one polarity signals causing said one diode to produce output signals having a first relatively large subharmonic component, and said other polarity signals causing said one diode to produce output signals having a second relatively large subharmonic component, said second subharmonic component being out of phase with said first subharmonic component.

19. A memory system comprising a pair of negative resistance diodes, each having a relatively high voltage and a relatively low voltage operating state, and each requiring a signal of at least a given amplitude to the applied thereto to change from said high voltage to said low voltage operating state, said diodes being connected in series with each other in the same sense, a capacitor connected across one of said diodes, and a bandpass filter connected cross said capacitor, first and second writing means connected at a junction point between said pair of diodes for applying selectively to said diodes write signals of either one or the other polarity, any one of said write signals having an amplitude less than said given amplitude, and any pair of write signals of like polarity together having an amplitude greater than said given amplitude, and means for applying energizing signals across said pair of diodes.

References Cited in the file of this patent

UNITED STATES PATENTS

| | | |
|---|---|---|
| 2,614,150 | Kreer | Oct. 14, 1952 |
| 2,823,321 | Sims | Feb. 11, 1958 |
| 2,862,139 | Williams | Nov. 25, 1958 |
| 2,870,347 | Jensen | Jan. 20, 1959 |
| 2,879,409 | Holt | Mar. 24, 1959 |
| 2,892,979 | Ogletree | June 30, 1959 |
| 2,944,164 | Odell et al. | July 5, 1960 |
| 2,966,599 | Haas | Dec. 27, 1960 |
| 2,986,724 | Jaeger | May 30, 1961 |

FOREIGN PATENTS

| | | |
|---|---|---|
| 1,172,034 | France | Feb. 4, 1959 |